F. D. WINDELL.
APPARATUS FOR AUTOMATICALLY CONTROLLING RELATIVE HUMIDITY.
APPLICATION FILED JUNE 10, 1914.
1,153,987.
Patented Sept. 21, 1915.
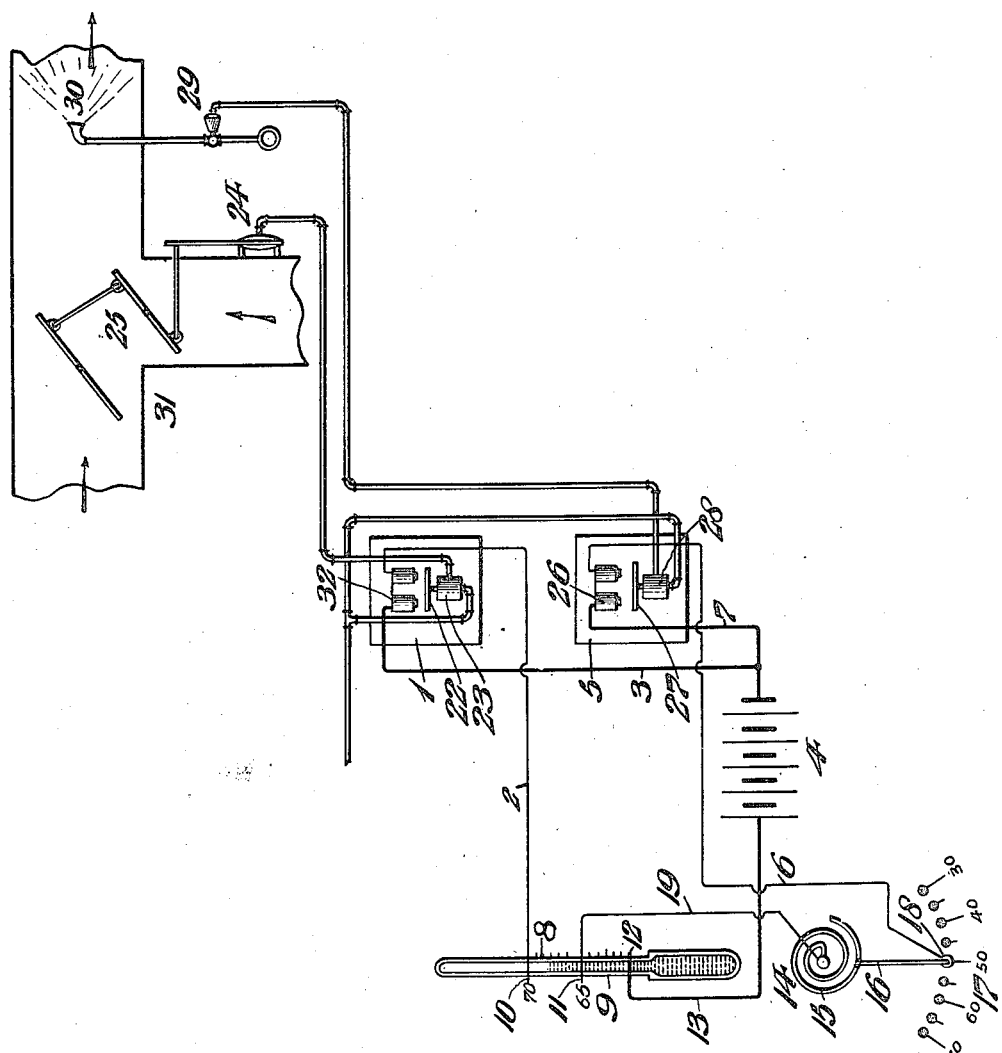
WITNESSES
INVENTOR
Frank D. Windell.
BY Wiedersheim & Fairbanks.
ATTORNEYS

UNITED STATES PATENT OFFICE.

FRANK D. WINDELL, OF PHILADELPHIA, PENNSYLVANIA, ASSIGNOR OF ONE-HALF TO HENRY LEWIS WILLIAMS, OF PITTSBURGH, PENNSYLVANIA.

APPARATUS FOR AUTOMATICALLY CONTROLLING RELATIVE HUMIDITY.

1,153,987.

Specification of Letters Patent. Patented Sept. 21, 1915.

Application filed June 10, 1914. Serial No. 844,382.

*To all whom it may concern:*

Be it known that I, FRANK D. WINDELL, a citizen of the United States, residing in the city and county of Philadelphia, State of Pennsylvania, have invented new and useful Apparatus for Automatically Controlling Relative Humidity, of which the following is a specification.

My invention consists of a method and an apparatus for automatically controlling the temperature and humidity of one or more spaces or rooms and maintaining the predetermined degree of temperature and humidity and in which the temperature is independently controlled and temperature and humidity jointly controlled.

It further consists of such method and apparatus which is adapted to be employed in connection with a heating and air-moistening system for which application for Letters Patent were filed by me on May 6, 1913, Serial No. 765,838, and patented October 13th, 1914, No. 1,113,724.

It further consists of the employment in such a system of a hygroscopic controlling device which is directly affected by the moisture present in the atmosphere.

It further consists of other novel features of construction all as will be hereinafter fully set forth.

The annexed drawings and the following description set forth in detail one mechanical form embodying the invention, such detail construction being but one of various mechanical forms in which the principle of the invention may be used.

Said annexed drawing represents a diagram of an apparatus embodying my invention.

Referring to the drawing, the reference numeral 1 indicates an electrically operated temperature controlling device, having a conductor, 2, connected to the circuit-controlling devices, to be hereinafter described, and a conductor, 3, connected to a battery, 4, or other source of electricity. A humidity controlling device, 5, has a conductor, 6, connected to a circuit-controlling device, to be hereinafter described, and a conductor, 7, connected to the conductor 3 and current-generator 4.

A thermostat is provided in the room or space, the atmosphere of which is to be controlled, and as here shown consists of a usual mercurial thermometer, 8, having metallic contacts fused in its tube at predetermined points to form contact with the mercury column, 9. One of said contacts, 10, is at the maximum heat-point, which is predetermined, as, in the present instance, at seventy degrees, and is connected to the controlling conductor 2, and one contact, 11, is at the point indicating the heat-degree corresponding to the lowest temperature at which humidity is to be supplied, in the present instance, at sixty-five degrees. A contact, 12, is fused into the thermometer tube or bulb to have constant contact with the mercury therein, and a conductor, 13, connects said contact with a pole of the battery or source of electric current of opposite polarity to that of the pole 3 of such source.

A hygrometer, 14, is provided in the space or room, the temperature and humidity of whose atmosphere is to be controlled, and is of that character of hygrometer in which a body of a hygroscopic substance assumes varying shapes or more or less expands according to the amount of humidity absorbed by it. A preferable form of such device may be a flat helical body, 15, partly or entirely composed of a highly hygroscopic substance, firmly secured at one end and carrying a contact arm or index, 16, movable by change of shape of the body 15 and sweeping over a dial, 17, in which a contact, 18, is adjustable at various measured points. The helical body winds tighter or unwinds according to the amount of humidity it absorbs, and the dial is so subdivided that the index will point to different divisions of the same according to the per cent. of humidity contents of the surrounding atmosphere. The index-contact is connected to a conductor, 19, connected at its other end to the contact 11 of the thermostat at the point of temperature where humidity begins to be admitted. The movable contact of the dial has the conductor 6 of the humidity controlling device 5 connected to it.

In practice, the temperature and humidity controlling devices are connected to admit heated or cooled air to the room or space, the temperature and humidity of the atmosphere of which is to be controlled, and the thermostat and hygrometer are placed in such space. The number of controlling devices employed may be varied according to requirements, and only one device is illustrated and described, as the number of spaces controlled merely involves a corresponding increase and decrease in the number of devices.

The contacts in the thermometer-tube are placed in accordance with the maximum temperature required and the temperature at which the air in the space begins to receive its supply of moisture, and said temperature adjustments are permanent in the specific apparatus here disclosed or may be made movable. The maximum contact is connected to a terminal of the electrical actuating means of the temperature controlling device and the other terminal of such device is continuing the circuit through the source and to the mercury in the thermometer. As long as this circuit is open, the supply of heat continues, but closing of the circuit by the mercury rising to the maximum contact actuates the controlling apparatus to close off the heat supply. The adjustable contact on the dial is set at a point in the same to which the hygroscopic expansion member (the helix 15) will bring the movable contact index by its change of shape caused by absorption of humidity when the surrounding atmosphere reaches a given point of saturation, such as 50% in the illustrated instance, and as long as the percentage of humidity is fifty or less, the humidifying apparatus will be active and supply humidity to the atmosphere of the space. As soon as the relative humidity of the space exceeds the predetermined percentage, the index-contact will swing away from the adjustable contact, breaking the circuit and stopping the supply. The humidity controlling circuit is closed at the thermostat when the mercury is at and above the contact 11, and the humidity supply is under control whenever the temperature of the space or room reaches the predetermined point, as 65° in the illustrated example.

By employing the hygroscopic expansion device for the moisture control, such control is directly actuated by the amount of humidity in the atmosphere and absorbed by such device, and is more sensitive and always sensitive to indicate moisture in the surrounding atmosphere, which the usual wet-bulb thermometer will not be if its water supply is neglected, or if its wick is not properly attended to. By actuating the hygrometer by absorption of moisture, the hygrometer will always act when moisture is present in the surrounding atmosphere, while actuating the hygrometer by variations in the evaporation of moisture requires a constant attention to the water supply for the wet bulb.

The temperature controlling device is disclosed as applied to heated air, but instead of controlling heated air, the apparatus may be employed to control cooled air as the temperature changing medium, and the supply of such air stopped at a minimum point instead of at a maximum point of temperature.

The controllers may be of any desired or suitable construction, and are illustrated in the drawings similar to such controllers disclosed in my above-named patent, wherein the temperature controlling device 1 has an electro-magnet, 32, wound in the circuit from the battery 4 or other electric source and connected to the extreme contacts of the thermostat, and an armature, 22, connected to a valve, 23, to open the same when the armature is attracted. Said valve controls a fluid under pressure which actuates a motor, 24, operating dampers, 25, in the ducts, 31, one of which, as here shown, may be for a supply of heated air and the other for a supply of cold or tempered air, so that the air which is mixed after passing the two dampers is delivered to the room at a desired temperature. The humidity-controlling device 5 has an electro-magnet, 26, wound in the circuit of the source of electricity and having an armature, 27, connected to a valve 28, controlling fluid pressure to a motor, 29, of a humidity changing device, 30. One terminal of the circuit of the electro-magnet is connected through the hygroscope and the minimum heat contact 11 of the thermostat, and the contact 12 of the latter is connected to one terminal of the electric source and the other terminal of said source is connected to the electro-magnet of the humidifier-controlling device.

Other modes of applying the principle of my invention may be employed for the mode herein explained. Change may therefore be made as regards the mechanism thus disclosed, provided the principles of construction set forth, respectively, in the following claims are employed.

Having thus described my invention, what I claim as new and desire to secure by Letters Patent, is:—

1. An apparatus for regulating the humidity of the atmosphere of an inclosure consisting of means for supplying humidity changing medium, hygroscopic means for controlling the amount of said supply by the percentage of humidity in the inclosure within a predetermined range of temperature, and means in suitable connection with said hygroscopic means for limiting the admission of the supply of humidity changing medium within predetermined degrees of temperature.

2. In an apparatus for regulating the humidity of the atmosphere of an inclosure, consisting of means for supplying humidity changing medium, hygroscopic means for controlling the amount of such supply by the percentage of relative humidity of the supply, and thermostatic means in suitable connection with the hygroscopic means for limiting the admission of the supply of humidity changing medium within predetermined degrees of temperature.

3. An apparatus for regulating the humidity of the atmosphere of an inclosure, consisting of means for supplying a temperature changing medium, means for supplying humidity changing medium, hygroscopic means for controlling the supply of humidity changing medium, and means for controlling the temperature changing medium and connected with the hygroscopic means for limiting the admission of the supply of humidity changing medium.

4. An apparatus for regulating the humidity of the atmosphere of a space, consisting of an air humidifier, electric means for controlling the output of humidity of the same within the bounds of predetermined temperatures, and hygroscopic means changeable in shape under the direct influence of humidity and forming an adjustable make-and-break part of the circuit of said humidity controlling means and connected to control the same.

5. An apparatus for regulating the humidity of the atmosphere of a space, consisting of an air humidifier, thermostatic means for limiting admission of a supply of humidity at a predetermined minimum temperature, and hygroscopic means connected to control such limited supply.

6. An apparatus for regulating the humidity of the atmosphere of a space, consisting of an air humidifier, thermostatic means for limiting admission of the supply of humidity within predetermined degrees of temperature, and hygroscopic means actuated directly by the absorption of humidity in the space connected to control such limited supply.

7. An apparatus for regulating the temperature and humidity of the atmosphere of a space, consisting of means for supplying a temperature changing medium, means for supplying a humidity changing medium, an electrically actuated controller for such temperature means, an electrically actuated controller for such humidity means, electric circuits each connected to one of said controllers, a thermostat having contacts for the conductors of the temperature controlling circuit and a contact for one conductor of the humidity controlling circuit, and a hygroscopic controller connected in said conductor of the humidity-controlling circuit.

8. In a device of the character stated, a thermostat in suitable connection with devices for maintaining a predetermined temperature, a hygrometer in suitable connection with devices for maintaining a predetermined relative humidity, and a connection between said thermostat and hygrometer to render the latter operative at a predetermined temperature.

9. In a device of the character stated, means for regulating the relative humidity of an inclosure, means for independently controlling said temperature mechanisms for maintaining a relative humidity at predetermined points, and means for controlling said humidity mechanism and connected to said temperature controlling means to become operable at a predetermined temperature.

10. An apparatus for regulating the humidity of the atmosphere of an inclosure, consisting of means for supplying humidity changing medium, hygroscopic means for controlling the amount of such supply by the percentage of humidity in the inclosure within a predetermined range of temperature, and means in suitable connection with said hygroscopic means for automatically cutting off the humidity supply at a predetermined temperature.

11. In an apparatus for regulating the humidity of the atmosphere of an inclosure, consisting of means for supplying humidity changing medium, hygroscopic means for controlling the amount of such supply by the percentage of humidity in the inclosure within a predetermined range of temperature, and means for throwing out the operation of the same and cutting off the humidity supply at a predetermined minimum temperature.

12. An apparatus for regulating the humidity of the atmosphere of an inclosure, consisting of means for supplying a temperature changing medium to an inclosure, means for supplying a humidity changing medium to the inclosure, means for controlling the supply of the temperature changing medium, means for limiting the supply of the humidity changing medium, and hygroscopic means connected to such limiting means to control the humidity changing medium until such limit is reached.

13. An apparatus for regulating the humidity of the atmosphere of an inclosure, consisting of means for supplying a temperature changing medium to an inclosure, means for supplying a humidity changing medium to the inclosure, means for controlling the supply of the temperature changing medium independently of the humidity, and means for controlling the supply of the humidity changing medium within limits regulated by the temperature control.

14. An apparatus for regulating the humidity of the atmosphere of an inclosure, consisting of means for supplying a temperature changing medium to an inclosure, means for supplying a humidity changing medium to the inclosure, means for controlling the supply of the temperature changing medium independently of the humidity, and means for cutting off the supply of humidity changing medium at a predetermined temperature in the inclosure.

15. An apparatus for regulating the humidity of the atmosphere of an inclosure, consisting of means for supplying a temperature changing medium to an inclosure, means for supplying a humidity changing medium to the inclosure, means for controlling the supply of the temperature changing medium independently of the humidity, and means in suitable connection with the temperature control for cutting off the supply of humidity changing medium at a predetermined minimum temperature.

16. An apparatus for regulating the humidity of the atmosphere of an inclosure, consisting of means for supplying a temperature changing medium to an inclosure, means for supplying a humidity changing medium to the inclosure, means for controlling the supply of the temperature changing medium independently of the humidity to maintain a predetermined temperature in the inclosure, and means in suitable connection with the temperature control for cutting off the supply of humidity changing medium at a predetermined percentage of relative humidity at said predetermined temperature in the inclosure and for cutting off the supply of humidity changing medium at a predetermined minimum temperature.

17. An apparatus for regulating the humidity of the atmosphere of an inclosure, consisting of means for supplying a temperature changing medium to an inclosure, means for supplying a humidity changing medium to the inclosure, means for controlling the supply of the temperature changing medium independently of the humidity, and means in suitable connection with the temperature control for maintaining a predetermined relative percentage of humidity in the inclosure at a predetermined maximum temperature and for cutting off the supply of the humidity changing medium at a predetermined minimum temperature.

FRANK D. WINDELL.

Witnesses:
 C. D. McVay,
 N. Bussinger.